Aug. 6, 1963   D. D. CARROLL   3,099,894
STUFFED ANIMATED TOY ANIMAL
Filed Nov. 16, 1960   2 Sheets-Sheet 1

INVENTOR.
DAVID D. CARROLL
BY
ATTORNEYS

Aug. 6, 1963  D. D. CARROLL  3,099,894
STUFFED ANIMATED TOY ANIMAL
Filed Nov. 16, 1960  2 Sheets-Sheet 2
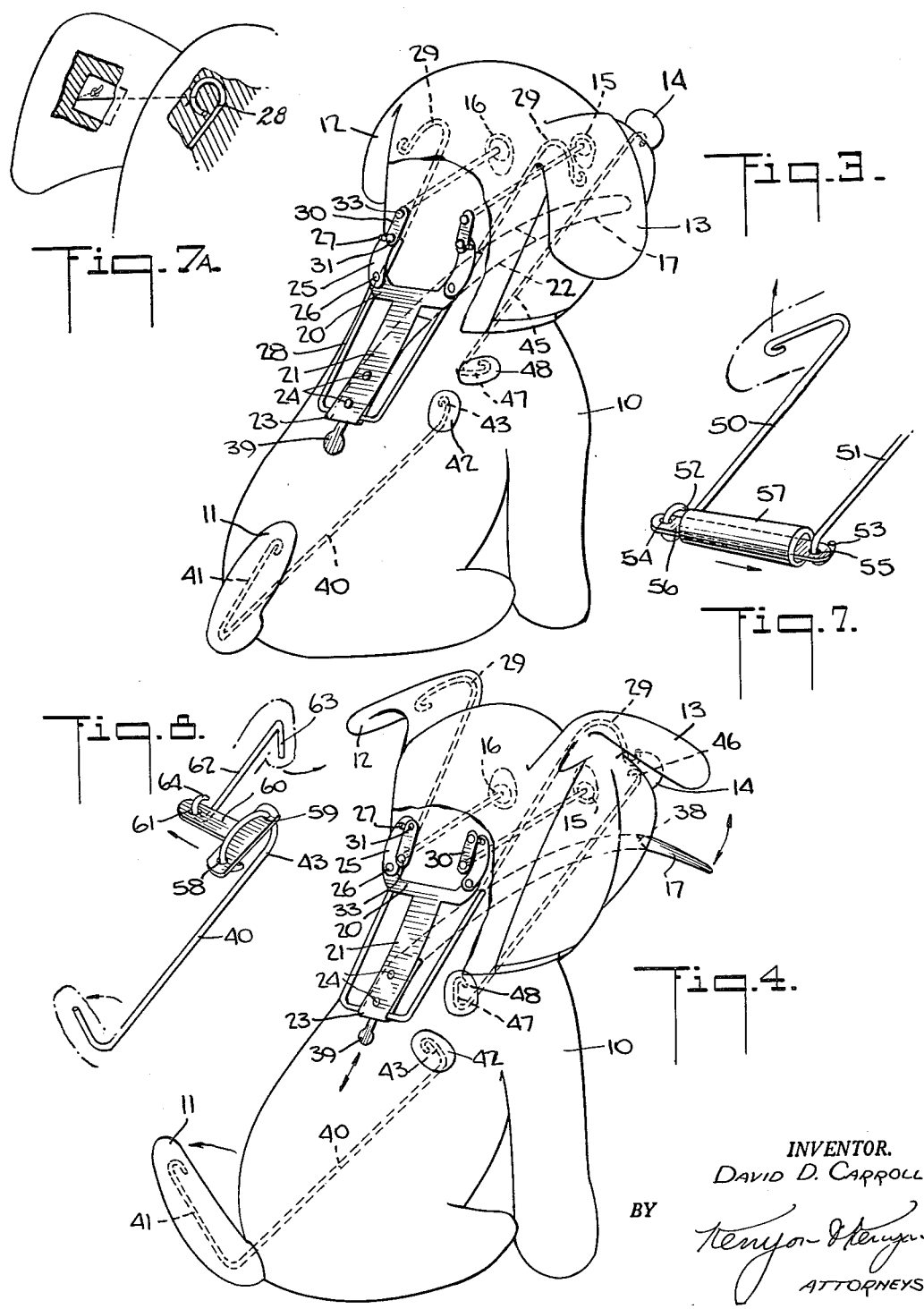
INVENTOR.
DAVID D. CARROLL
BY
ATTORNEYS

United States Patent Office 3,099,894
Patented Aug. 6, 1963

3,099,894
STUFFED ANIMATED TOY ANIMAL
David D. Carroll, P.O. Box 563, Bennettsville, S.C.
Filed Nov. 16, 1960, Ser. No. 69,733
11 Claims. (Cl. 46—135)

My invention relates to animated stuffed toy animals and more particularly to stuffed toy animals having manually actuated patterns of expression and action simulating the actions and expressions of a life-like animal.

Stuffed toy animals have always been popular with children and adults alike. Such animals are generally caricatures of their real life counterparts, designed to evoke feelings of emotional warmth in those who observe and fondle them. A strong commercial advantage in stuffed animals has always been that they are life-like to the touch and under squeezing and fondling. However, such toys, unless mechanically animated, must rely for their appeal on color, form and a set or single facial expression and these attributes tend to decrease appeal to buyers after prolonged exposure.

In general, mechanical animation has not been imparted to stuffed animals because they are charged or filled with stuffing at manufacture by pressured delivery or other similar means. It has been found that mechanically animated toy animals are reliable only if formed from hard hollow casings with the mechanism contained therein.

Specifically, if one embedded the usual cheap or simple spring wound motor or other mechanism in the stuffing of a toy animal, it would result in clogging the mechanism. This clogging frequently occurs in the pressured stuffing step in manufacture or upon use by the ultimate buyer. In addition, such mechanical mechanisms, unless anchored to a fixed base, may become misaligned and thus inoperative. Commercial experience records many instances of such defects. Moreover, no method of mechanization has heretofore been devised which was practical as a factory production system. Indeed, the very absence of trustworthy animation devices, despite years of manufacturing effort, supports the novelty of my invention.

Thus, ordinary stuffed toy animals have high fondling appeal, but because of fixed expression and posture they lose their unique appeal quickly. Ordinary mechanical toys have low fondling appeal and less safety but sustain their selling uniqueness better. However, mechanical stuffed toys tend to be unreliable in manufacture and usage. A final disadvantage is that the mechanical working is so limited that novelty is lost after a few operations.

It is obvious that strong selling advantages would inhere in a stuffed animal that has certain of the advantages of animated hard cased animals without the disadvantages and without the annoying tendency of animated stuffed animals to become inoperative of monotonous after a few usings. Also, a successful stuffed animated animal should embody appeal and safety for children.

It is, therefore, an object of the present invention to provide a toy stuffed animal that is animated in an appealing manner without the use of a spring wound motor or other mechanical prime mover subject to jamming, rusting, leaking, breakage or other failure.

It is another object of the present invention to provide a simply stuffed animated toy animal that is pleasant to touch and fondle, thus having great appeal to children.

It is a further object of the present invention to provide a stuffed animated toy animal that is extremely safe to use because of the padded contour and the nature of the animation mechanism.

Yet another object of the invention is to allow fabrication of an extremely simple and economical mechanism that may be employed to coordinate several motions and expressions in the animal and yet is harmless to children mechanically and chemically and will not disfigure or cripple the animal by rusting, leaking lubrication or impact breakage.

Finally and especially, it is an object of the present invention to provide a human-like animal personality which is variable with the operator's own imagination. No earlier mechanical devices achieve this. In the instant device, the direction, intensity, mood and coordination of action may all be chosen by the operator. For each movement he chooses, he may think up endlessly different situations and different dialogues or "sayings" for his animal. He does not merely manipulate a mechanism, he directs the actions. Actually, the acting of this newly invented animal lifts its appeal above child puppetry and offers a conversation and dialogue piece to sophisticated adults.

Other objects and advantages of the present invention will become more apparent upon more particular disclosure by the following description and appended drawings, in which:

FIG. 3 is a semi-rear view of the animal of FIGS. 1 and 2 showing the actuating mechanism in outline and in phantom and having the mechanism positioned to elicit the animal action of FIG. 1;

FIG. 4 is a view similar to that of FIG. 3, showing the animal with the mechanism eliciting the action of FIG. 2;

FIG. 7 is a detail of an ear manipulating mechanism.

FIG. 7a is a detail of another ear manipulating mechanism similar to the one shown in FIG. 7.

FIG. 8 is a detail of a tail and arm manipulating device.

Figure 1:
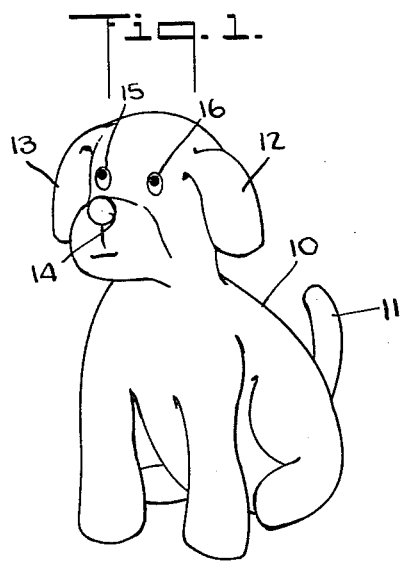
FIG. 1 is a perspective view of a dog as one animal embodiment showing a first expression or action.

With reference to the drawings, my invention comprises in general a stuffed toy animal body 10 and a yoke mechanism 20. The stuffed body 10 comprises, in the embodiment set forth herein, a caricature of a dog, having the usual outline of a canine in sitting posture. It is understood that the present invention also applies to other animals having different features and postures.

Stuffed animals are usually made commercially by first sewing the fabric or tufted fabric carcass together and then delivering the stuffing material thereinto at high pressure from a base or spout. This material accounts for part of the unreliability of the usual attempts at creating animated stuffed animals. Incorporating a simple prime mover within such animals before or after stuffing results in clogging, misalignment, fragility, production delay and merchandise returns. Also, the inserted stiff mechanisms, by nature, cannot yield with resilience to the pounding involved in juvenile use.

However, in my invention stuffed body 10 may be fabricated by the aforesaid or other commercial methods without danger of rendering any mechanism inoperative. Also, the finished animal will withstand unprecedented amounts of tumbling and pounding and will not be forced out of shape or inoperate the movable parts.

Stuffed body 10 has, in addition to the fixed appendages usually attendant a stuffed animal, a plurality of movable appendages. Thus tail 11 preferably has a small amount of stuffing omitted near its base connection to body 10 so that it is movable at that juncture. However, even if firmer stuffing is used, my tail still operates because the thin structure is subjected to magnified leverage. Ear members 12 and 13, regularly free of stuffing in this toy, are movable in a way to be hereafter explained. Similarly, eye members 15 and 16, tongue member 17 and nose member 14, which are all separately formed from the general body 10 configuration, are free to move in patterns and by means to be hereafter explained.

The yoke mechanism 20 comprises a generally T-shaped member 21 formed from sheet stock, preferably a non-rusting, pliable and self-lubricating plastic such as polyethylene. Though not shown, the horizontal bar in the T-shaped member 21 may be a separate piece fastened to the vertical bar by metal or plastic eyelets, rivets or snap-ons. The lowermost portion of said T-shaped member 21 is folded under upon itself to form tongue root member 22. Tongue root member 22 may also be fabricated separately from T-shaped member 21; but in either case must form a loop therebetween as at 23.

Ear actuating means 28 comprise preferably a stiff wire bent to a general U-shape and having the legs of the U bent outwardly and terminated in a curvilinear configuration 29 so as to be safe from danger of causing punctures of the skin fabric, obstructive snagging inside the ear, or harmful rigid projections. The bottom portion connecting the legs of the U-shaped ear actuating means 28 is enclosed by the aforesaid looped portion 23 of T-shaped member 21. The looped portion 23 is tacked together to complete the loop, as for example by metal or plastic eyelets, rivets or snaps 24.

Another aim here is to double the strength and rigidity of the thrusting section from 23 to the upper eyelet or rivet. This doubling in effect makes a handle.

By opening, eliminating or avoiding the lower of the two rivets shown in the drawing, variable movement of the ear actuating means 28 is obtainable. Similarly, if T-shaped member 21 is separately formed from tongue root 22 and member 21 is given a slot down the center of its vertical bar portion, the delayed engagement of fasteners 24 in this slot will accelerate the ear and tongue action over the eye action. Drawings have not been deemed necessary for this variable action.

At each end of the cross-bar of T-shaped member 21 are pivoted driving members 25. Driving members 25 are short arm members having a slight inward curve, loosely pivoted at one end by plastic or metal eyelets, rivets or snap fasteners 26 or the like, upon said cross-bar of T-shaped member 21. Driving members 25 are pivoted at their other end to crank members 30. Crank members 30 are also short arm members, and are similarly pivoted to driving members 25 by plastic or metal eyelets, rivets or snapons 31 or the like. Adjacent the pivot 31 between each driving member 25 and crank member 30 it is preferable to incorporate a protuberance 27, which may be a small molded dowel of plastic, a rivet, eyelet or the like. In both the assembly from the right and from the left cross-bar of T-shaped member 21, the protuberance 27 appears on driving member 25 outwardly of the pivot with crank 30. The protuberance 27 prevents reverse, outward or erroneous movement of crank member 30 when the T-shaped member 21 is actuated upwardly. In lieu of protuberance 27, the upper and outer edge of driving members 25 may be molded to curve upwardly at their outer top edge to provide stop ridges for crank member 30.

Figures 5, 6:
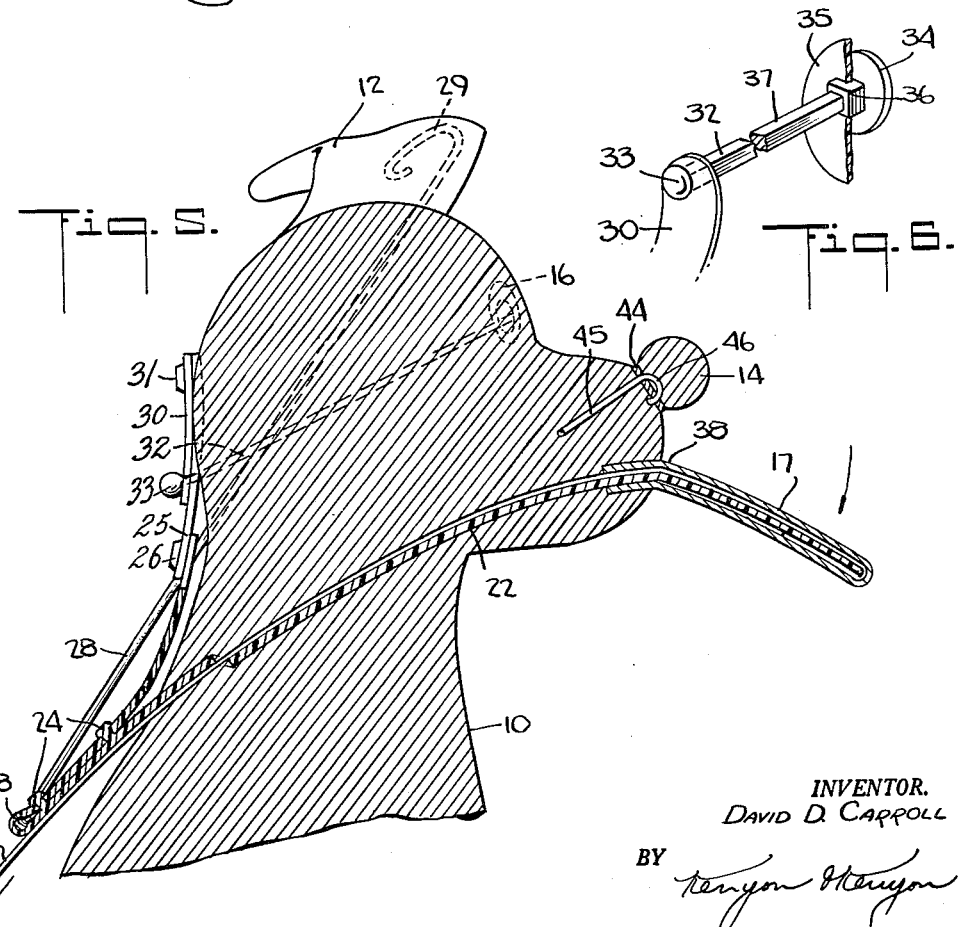
FIG. 5 is a sectional view of the animal head of FIG. 2 showing details of the mechanism.
FIG. 6 is a detail view of the eye actuating mechanism.

Eye shafts 32, which are best viewed in FIG. 6, comprise preferably a square cornered cross-section or similar shaft body 37 which may, because of its cornered cross-section, easily be keyed at either end. One end of each of the eye shafts 32 is mated with a square cornered hole provided in crank members 30 and locked in place longitudinally by a balled end 33. This balled or other enlarged end 33 may be an integral part of its square cornered eye shaft; or it may be separately formed and attached or cemented on. The square cornered cross-section of eye shaft 32 registering with the square cornered hole in crank member 30 locks shaft 32 to crank member 30 rotationally. The main shaft body 37, a continuation of 32, is disposed through the head of the animal and emerges at the face side at the position where the eye normally appears in an animal.

Affixed to the portion of shafts 37 that emerge from the animal's face are a pair of eyes made of plastic or similar material. These eyes comprise a preferably black pupil 34 and a preferably white iris 35. Pupil 34 is an essentially round knob-like member that is surmounted at its rearmost portion by a square boss shank 36 having a smaller square or cornered hole therein adapted to receive shaft 37 in close registration.

Alternately, though not shown, pupil 34 may be formed as an integral part of shaft 37, eliminating the need for square boss 36 and the separate assembly of pupil 34 on shaft 37.

Iris 35 as shown is of flat stock, preferably pliable plastic, leather or the like and is elliptical in outline. A more elaborate convex eyeball is, of course, also moldable for use with or without pupil 34. Appearing in iris 35 at an eccentric position is a square hole adapted to mate with boss 36 on puil 34. Iris 35 is thus locked to pupil 34 which is in turn locked to shaft 37 which is in turn locked to crank 30.

Alternately, though not shown, white iris 35, either flat or convex, may be permanently formed or affixed upon shaft 37, in which case the shape of a pupil would be printed, molded or affixed upon iris 35.

The T-shaped member 21 is folded under and terminates in tongue root member 22, as previously explained. Tongue root member 22 is shown terminated at its end 38 by a squared-off end upon which is mounted the actual tongue 17. Tongue root member 22 plus tongue 17 are of such a length as to pierce the animal's head and barely emerge from the animal's face in the usual tongue position when the overall mechanism is positioned as in FIG. 4. Alternately, tongue 17 may be merely a continuation of tongue root member 22, in which case it is preferred that they be one integral member.

Tongue 17 may be curlable, in which case it will be separately formed and mounted in tongue root 22 at end 38 as described. In the preferred tongue curling embodiment illustrated, the exterior of the flexible tongue-shaped section 17 is conventionally colored red and preferably made of a thin pliable platsic or fabric forming a sheath around an inner tongue form of thin plastic, wood, metal, leather or other bodied material. The outer sheath is long enough to receive a portion of tongue root 22 and to be affixed thereto by eyelet, rivet or stitching. An actuating cord or flat connecting strip 39 is guided along tongue root 22 into the sheath of tongue 17 that overlaps root 22 and thereupon crosses end 38 upwardly so as to run upwardly inside the sheath of tongue 17. The end of the actuating cord or flat connecting strip 39 is attached to the under portion of the end of tongue 17 thus providing means for moving the tongue in a vertical arc.

Tail 11 is pivotable in a lateral plane as has been explained, and a bent wire member 40 is disposed in the stuffing of the animal so as to terminate in a blunted lever 41 at one end disposed within the tail 11 at an approximate right angle to the main portion of wire member 40. Inside tail 11, lever 41 ends in a curved eye which may be anchored by rivet, eyelet, stitching or otherwise. Member 40 terminates in a short blunted lever 43 at the portion of the animal immediately adjacent the other feature actuating means described above. Lever 43 emerges from the animal body and is covered by padding 42 affixed to said body or to lever 43.

Nose 14 is also movable as has been stated already, the sniffing movement being by rotation or projection. Specifically, nose 14 is fabricated of a pom-pom ball of cotton yarn or other fluffy material simulating a dog's nose, backed by leather, plastic or other durable material, and is pivotable through that base or backing 44. A stiff wire or other rigid actuating member 45 is run within the animal's stuffing to the nose 14 where it is affixed thereto by loop 46 through base 44. Actuating member 45 is first inserted at a point near all the other actuating mechanisms recited. Member 45 terminates at this point outside the animal in right angled lever 47. This lever 47 is covered by padding 48 which may also be attached to the body. It is contemplated that levers 43 and 47, actuating tail 11 and nose 14 may also be terminated within a common padding and affixed to each other so as to be actuatable in coordination if desired.

In operation, the various mechanisms coact to perform the stated function and result as follows: When the mechanism is set to the position illustrated in FIG. 3, the expression illustrated in FIG. 1 is elicited. This is accomplished by the fact that the operator has pulled U-shaped wire 28 downwardly toward the animal's tail as far as it will go. The length of the legs of U-shaped wire 28 is such that the curvilinear configurations 29 will be thereupon withdrawn close to the stuffed portions of the head at the base of the ears 12 and 13. When the wire 28 is in this bottom-most position, tongue 17 which is affixed to tongue root 22 and thereby to U-shaped wire 28 by means of loop 23 will be completely withdrawn into the animal's mouth, virtually or completely out of sight. By virtue of curvilinear portions 29 having been bottomed on the head stuffing as mentioned, ears 12 and 13, being without any stuffing, will have fully collapsed alongside the animal's head.

When U-shaped wire 28 is in this bottom-most position, the relation of eye shaft 37 to iris 35 rotatably affixed thereto will be such as to present an eye expression as shown in FIG. 1, wherein the eccentric elliptical iris 35 is rotated to a position where the eccentric portion is disposed downwardly of the animal's face, giving a sad or doleful expression to the eyes.

Upon movement of U-shaped wire 28 upwardly toward the animal's head, the various features are actuated as follows: U-shaped wire 28 may be translated upwardly until the looped portion 23 of T-shaped member 21 engages at fasteners 24 with the entrance slit of tongue root 22 into the back of the animal's head. Another limitation on the distance of this translation arises when driving members 25 have been fully closed upon crank members 30 from the completely open or extended relationship of FIG. 3 to the completely closed relationship of FIGS. 4 and 5. It is desirable to have as much closing as possible between these two members in order to fully actuate the eyes, but in order to spare the pivots 26 and 31 from excessive stress with use, it is preferred to arrange the parts so that the looped portion 23 at rivets 24 will bottom on the animal's head simultaneously or slightly before members 25 and 30 have completely closed. In this way repeated shocks are spared pivots 26 and 31.

Tongue root 22 is of such a length that when looped portion 23 is bottomed on the animal's head as described, and as shown in FIG. 5, tongue root 22 will have advanced so that tongue 17 is protruded from the animal's mouth. Actuating cord or strip 39 may then be manipulated. When cord or strip 39 is pulled toward the animal's tail, tongue 17 is disposed to curl upwardly by virtue of the tacking of cord or strip 39 to the underside of tongue 17 as described. When cord or strip 39 is released, tongue 17 licks downward again.

The various components of eyes 15 and 16 are keyed to shafts 37 which in turn are keyed to cranks 30, all as described. Shafts 37 are disposed through the stuffing of the animal's head and are rotatable therein. When U-shaped member 28 is moved upwardly from the position of FIG. 3 to the position of FIGS. 4 and 5, pressure is transmitted to driving members 25 and, by virtue of their pivoting to cranks 30, they force these cranks outwardly and upwardly so that the left-most crank in FIGS. 3 and 4 is rotated in a clockwise fashion while the right-most crank is rotated in a counter-clockwise direction.

Such motion is guaranteed by the fact that pivots 31 are not permitted to move closer together than pivots 26, thus assuring proper rotation of cranks 30 outwardly as described. To assure that pivots 31 are not inadvertently turned inward prior to advance of U-shaped wire 28 upwardly, the aforementioned protuberance 27 or alternate curved edge on driving members 25, prevents any turning of members 25 and 30 in the inward direction.

As mentioned, when the U-shaped wire 28 is manipulated fully downwardly as in FIG. 3, elliptical irises 35 are disposed downwardly on the animal's face. That is, since cranks 30 are rotated approximately 180° by the action of the advance of U-shaped wire 28 as aforesaid, shafts 37 and irises 35 keyed thereto will also be rotated approximately 180° so that the elliptical irises 35 are disposed downwardly, giving the sad or dejected expression of FIG. 1.

Figure 2:
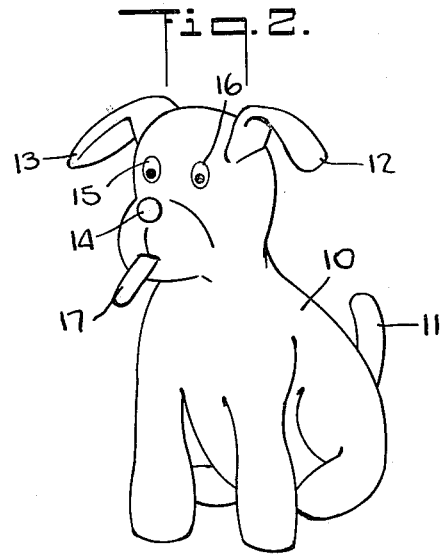
FIG. 2 is a perspective view of the animal of FIG. 1 wherein a second expression or action has been elicited.

Also, when U-shaped wire 28 is pushed upwardly, curvilinear extensions 29 thereof are pushed up into ears 12 and 13 and cause the ears to rise up alertly as in FIG. 2. It is thus seen that the manipulation of U-shaped wire 28 upwardly manipulates eyes 15 and 16, tongue 17 and ears 12 and 13 from the sad, doleful expression of FIG. 1 to the happy, alert, expectant expression of FIG. 2. This action is very evocative of approval on the part of children.

It has already been described how tongue 17 may be curled when in position as in FIG. 2 for additional effect. Also, by manipulating levers 43 and 47 with the fingers of the same hand that manipulate the U-shaped wire 28, an additional happy effect can be added to the expression of FIG. 2, in that the animal will seem to wag its tail 11 and crinkle its nose 14. As mentioned, levers 43 and 47 may be attached so as to be movable in unison. Also, they may be manipulated by a protuberance in wire 28 (not shown) that will move the levers back and forth when the U-shaped wire 28 is manipulated up and down in a slight oscillating fashion. It is understood that the sad expression of FIG. 1 may be resumed by reversing the above process and positioning the mechanism as in FIG. 3.

It should be understood that various changes in the curvilinear configuration 29 and the shape of the ears may be substituted for different animals. For a dog it is preferable that the ears move upward as shown, while for an elephant they should flap forwardly, while for a rabbit they should be bent, flappy and have a rotating action to imitate the normal twitching. Various changes of the ear construction may be easily made to perform these different animated actions.

Rabbit ears being of elongated shape and carriage from most animal's ears, the U-shaped wire member in our dog is supplanted in rabbits by two separate wire shafts which enter the back of the animal's head, as in the case of the dog, but may be operated as separate shafts. The wire shaft in the rabbit's ear extends the full length of the ear's interior, then is bent at the upper end so that the bent wire, when twisted by a looped lever at the lower end, causes the upper, bent portion of the rabbit's ear, bent downward at approximately half the ear's length, to turn from left to right and back again.

The lower, looped end of this wire shaft is linked with a similar wire shaft operating the rabbit's other ear. This linkage is achieved by the use of a plastic, fiber, paperboard or other hollow tube through which a durable and substantially rigid plastic, metal or other durable strip has been thrust. Each end of the strip protrudes from the tube far enough to permit a hole in each end of the strip to contain the looped wire lever at that end. Thus, the tube, manipulated sidewise or up and down imparts through the strip action to the rabbit's ears.

The rabbit's ear may be equipped before or after stffing of the body.

On the other hand, as shown in FIG. 7a, elephant's ears, being flapped forward and backward, in contrast to the up-down movement of dog-like ears and the comically bent, rotating movement of rabbit ears, require the insertion of segments of plastic, leather or other resilient material inside each ear. These pieces are in the general shape of the elephant's ear. A cord is attached to this resilient inner piece at its outer edge. That is, at the edges farthest from the elephant's head. The other end of the cord is passed through the ear, into that side of the head, where it meets and ties into the curved eye-ending of a wire shaft. The wire shaft preferably is part of a U-shaped wire 28, as in the dog's head; or the single wire shaft employed in the rabbit's head may be used.

In different models of the elephant, the wire shaft may be eliminated entirely and the ear cord may continue through the head, down and backward, to emerge from the back of the neck. In such cases, a cotton yarn pom-pom, or other agreeable material may serve as a grasping end for a cord leading to each ear or both ears. Pulling the cord will result in backward movement of the plastic pieces. The compressed resilience of these pieces, when the pom-pom or cord is released, will cause the elephant's ear to swing back to its former position. The elephant's ear must be prepared prior to stuffing of the body.

Moreover, manipulation of the semi-rigid combined structure of plastic and wire, by bobbing the "handle" up and down causes the head to say "yes," "no," crank, tilt and cock. The entire animal offers almost limitless experimentation to the user to see what combinations of effects he may evoke.

One structure for accomplishing this movement is shown in FIG. 7, wherein the ear actuating means 28 shown in FIGS. 3 and 4 are two separate wires 50 and 51 having their ends curled or eye-shaped as at 52 and 53. The curled end sections 52 and 53 register in apertures 54 and 55 of an interconnecting plastic strip 56 which keeps the ear actuating means 50 and 51 in a fixed spaced relationship. The plastic or rigid strip 56 may be provided with a protective plastic or metal tube 57 to assist in manipulating the ear actuating means from left to right. With the construction shown in FIG. 7, it is possible to pivot the ears as well as move them in the vertical direction as previously explained.

In addition, with this particular construction it is also possible to tilt the head from side to side or forwardly and backwardly, thus adding a vast number of different movements to the animal.

As can readily be seen, the plastic strip 56 and tube 57 may be inserted in the structure previously described by substituting said construction for the ear actuating means 28. The tube would pass through the loop at 23 below the eyelets or rivets 24.

It is also possible to interconnect the movement of the tail and an arm member. A structure suitable for accomplishing this cooperating result is shown in FIG. 8, wherein the upper lever end 43 of tall wire member 40 is circularly bent and passes through to apertures 58 and 59 in a plastic T plate 60. The apertures 58 and 59 are at the outer ends of the top of the T plate. A third aperture 61 is located at the bottom end of the T plate and is provided to pivot an arm wire 62 which is curved at its end 63. The end of the arm wire 62 that passes through the T plate aperture 61 is also circular as at 64. When looking directly at the back of the animal, arm wire section 64 is vertical and perpendicular to the body, while the circular tail section lever 43 of tail wire 40 is perpendicular but angled about 45° from the vertical. By transversely moving the entire T plate, the arm wire section 64 pivots to a 45° angle, while the tail lever section 43 pivots to about 90°. Thus, by manipulating plastic T simultaneous movements may be imparted to the tail and the arm member.

When the above embodiment is incorporated in an animal, it is preferable that the animal be constructed to provide a more upright or begging position, and constructing the front arm members in such a manner that they protrude outwardly and then downwardly. It can readily be seen that with this particular structure that arm wire 62 extends through the outwardly protruding section of the arm, while the curved end 63 extends in the downwardly extending section. By pivoting the wire 62 with the transverse movement of the T plate 60, the downwardly extending portion of the arm section is pivoted in front of the animal.

Since there are no mechanical prime movers to clog with stuffing, misalign or break by impact, the device is reliable and very economical. The soft, non-rusting, non-lubricated plastic parts make the stuffed animated toy animal safe and clean. As an engineering innovation, the improvements may be inserted before or after stuffing of the animal carcass, a method within itself inventive. Though not part of the mechanics, the completed animal has a soft fabric covering specially designed to cover the critical parts and no harmful structure is exposed or even exists.

It is to be understood that other animal and human embodiments are contemplated and particularly that other ear, eye and tongue configurations are contemplated. I desire to be limited only by the appended claims and not by way of the materials and particular configurations set forth above, which are only by way of example.

I claim:

1. An animated stuffed toy animal comprising a stuffed body portion including a head affixed thereto, a pair of limp ears depending from said head, a pair of eyes at the face of said head, a pair of eye shafts each fixedly attached to one of said eyes and rotatably housed within said head from front to rear, a crank fixedly attached to the rearmost end of each of said eye shafts, yoke means adjacent the back of said animal and having a pair of legs slidably disposed in said head at either rear side thereof and thence into each of said ears respectively, actuating means disposed adjacent the back of said animal and affixed to said yoke means, the free end of said crank members being pivotally attached to the adjacent end of the spacing bar member of the yoke means, tongue root means slidably contained within said animal's head and affixed at one end to the rearmost portion of said tongue and at the other end to said yoke means, whereby sliding of said yoke means up and down said animal's back raises and lowers said ears and rotates said eyes and expels and retracts said tongue.

2. The stuffed toy animal according to claim 1 wherein said tongue portion is surmounted by a sheath and said sheath is affixed to said tongue root portion; and further wherein a pull member runs along the underside of said tongue root portion thence into said sheath and up along in juxtaposition to said tongue root portion and said tongue portion and is fixedly terminated at the outermost lower portion of said tongue portion, and the other end of said pull member being braced by said yoke means whereby actuating said pull member downwardly adjacent said yoke means flips said tongue upwardly.

3. An animated stuffed toy animal comprising a stuffed body portion including a head, a pair of limp ears depending from said head, a pair of eyes at the face of said head, a pair of eye shafts each provided with one of said eyes and rotatably housed within said head, yoke mens situated adjacent the back of said animal and affixed thereto comprising a generally U-shaped member having a bottom connecting portion transverse to said animal and a pair of upwardly extending legs, said legs being slidably housed adjacent the rear side of said animal's head, each of said legs terminating in each of one of said ears, a T-shaped member disposed adjacent said animal's back provided with a cross-bar portion disposed toward said animal's head and laterally of the animal's body, said T-shaped member having the bottom portion cooperating with the bottom connecting portion of said U-shaped member, a pair of cranks, each of said cranks fixedly attached to the rearmost extremity of one of said eye shafts, a pair of driving members, each of said members pivotably affixed at one end to one of said T-shaped member's cross-bar portion and at the other end to the free end of one of said cranks adjacent thereto, tongue root means slidably disposed within said animal's head and affixed at one end to the rearmost portion of said tongue and at the other end to the bottom connecting portion of said U-shaped member, whereby sliding of said U-shaped member up and down said animal's back raises and lowers said ears and rotates said eyes and expels and retracts said tongue.

4. The stuffed animal according to claim 3 wherein said eye comprises an approximately elliptical iris portion having a substantially smaller pupil mounted eccentrically thereon, and further wherein said eye shafts communicate with said pupil so as to eccentrically mount said eyes.

5. The stuffed animal according to claim 3 wherein said eye comprises an approximately elliptical iris portion having a substantially smaller pupil mounted eccentrically thereon, and said eye shafts communicate with said pupil so as to eccentrically mount said eyes, and said elliptical eyes, said ears and said tongue are correlated to said yoke means so that translation of said yoke means upwardly rotates said elliptical eyes so that the eccentric portions thereof are disposed upwardly, and expels said tongue, and raises said ears, and so that translation downwardly reverses these motions.

6. A stuffed animal according to claim 1 wherein said animal has a tail and a nose, said tail is movable laterally of said animal's posterior and said nose is rotatable and projectable; and further wherein a bent lever is disposed through said body to each of said tail and said nose wherein a bent portion is contained so as to render them movable, and each of said levers having a second bent actuating portion which emerges from said body in the vicinity of said yoke means and wherein the legs of said bent levers are joined at their energizing ends within a common padding.

7. A stuffed animal according to claim 3 wherein a pair of wires each having bent portions at either end thereof are contained within said animal, said animal comprises a tail including therein a first bent portion of one of said wires, and one of said arm members including therein a first bent portion of the other of said wires, each of said wires having a second bent end protruding from the back of said animal, said second ends of said wires being pivotably affixed to a T-plate, said T-plate being free to move laterally and simultaneously pivot said second bent portions of said wires in said arm and tail members.

8. A stuffed animal according to claim 3 wherein said eye comprises an approximately elliptical iris portion having a substantially smaller pupil mounted eccentrically thereon, and further wherein said eye shafts communicate with said pupil and iris so as to eccentrically mount said eyes, said elliptical eyes, said ears and said tongue are correlated to said yoke means so that translation of said yoke means upwardly rotates said elliptical eyes so that the eccentric portions thereof are disposed upwardly, and expels said tongue, and raises said ears, and so that translation downwardly reverses these motions; and the bottom connecting portion of said yoke means comprises a spacing bar, said bar being pivotably connected to the legs of said yoke means.

9. An animated stuffed figure comprising a body portion having a head, said head portion having nose, ears, eyes and tongue members, T-shaped yoke means adjacent the back of said stuffed figure, said yoke means comprising a cross-bar having driving levers pivotally affixed thereto at each end thereof, a pair of crank levers, one end of each of said crank levers being pivotally affixed to the free end of one of said driving levers, a pair of shafts extending from the front of said head to the back thereof, the back end of each of said shafts affixed to the free end of one of said crank levers, the front end of each of said shafts provided with an eccentrically disposed elliptical iris and centrally disposed circular pupil, said T-shaped yoke means having a downwardly extending actuating member, a U-shaped yoke actuating means cooperating with the bottom of the downwardly extending actuating member of said T-shaped yoke means having two upwardly extending arms registering in said ear members, the free end of said upwardly extending arms in said ear member are provided with a downwardly bent section; said tongue member affixed to said downwardly extending actuating member of said T-shaped yoke means and extending through the head of said figure and provided with a flexible end section, tension means affixed to the bottom free end of said tongue and extending over the top thereof, said tongue tensioning means protruding outwardly adjacent the bottom of said T-shaped yoke actuating member.

10. An animated stuffed animal comprising a flexible stuffed body portion and a stuffed head portion, said head portion comprising a pair of ears and a pair of eyes, said eyes having a button-like pupil and elliptical iris, a pair of eye shafts, each of said shafts cooperating with one of said eyes through said pupil, said eye shafts rotatably housed within said head and extending from the face of said animal backward to the rear of said animal, a pivotal connection having crank members, said members cooperating with said eye shafts, said crank members provided with two driving lever members, each of said driving lever members pivotally affixed at one end to the free end of one of said crank members, a lateral cross-bar, said cross-bar being pivotally affixed the other free end of each of said driving lever members, an actuating member comprising a vertical bar, said vertical bar cooperating with said cross-bar at the center thereof, and extending downwardly, whereby when said actuating means is thrust upwardly upon said cross-bar which yokes said driving lever members and the dependent crank members, said eye shafts are rotated to turn upward the elliptical eyes, and whereby reversing said pull upon the said actuating means reverses said eye rotation downward.

11. An animated stuffed animal according to claim 10 wherein there is a U-shaped member comprising a pair of upwardly extending legs and a horizontally connecting bottom bar piece, said bar piece cooperating with the bottom of said vertical bar of said actuating member and laterally slidable therethrough, each of said legs of said U-shaped member slidably extending upwardly through said animal's head and provided with a curved-eye ending adjacent the ear, the inside of each of said ears provided with a thin resilient plate corresponding to the shape of the ear and having an aperture adjacent the outside edge thereof, a pull member affixed to one side of said plate through said aperture and extending around said plate to the other side thereof and affixed to said curved-eye ending of said leg of said U-shaped member, whereby said ear member is pivoted about its vertical axis when said bottom bar piece is moved laterally.

References Cited in the file of this patent

UNITED STATES PATENTS

| | | |
|---|---|---|
| 837,216 | Gilbert | Nov. 27, 1906 |
| 1,108,046 | Whitney | Aug. 18, 1914 |
| 2,271,312 | Shorter | Jan. 27, 1942 |